Feb. 22, 1966     R. R. KOOIMAN ETAL     3,237,138
INTEGRAL STRAIN TRANSDUCER
Filed Sept. 3, 1963     4 Sheets-Sheet 1

FIG. 1

INVENTORS
ROBERT R. KOOIMAN
ROBERT C. KNUTSON
BY
Dugger, Braddock, Johnson & Westman
ATTORNEYS

Feb. 22, 1966  R. R. KOOIMAN ETAL  3,237,138
INTEGRAL STRAIN TRANSDUCER
Filed Sept. 3, 1963  4 Sheets-Sheet 4

INVENTORS
ROBERT R. KOOIMAN
ROBERT C. KNUTSON
BY
Dugger, Braddock, Johnson & Westman

ATTORNEYS

United States Patent Office 3,237,138
Patented Feb. 22, 1966

3,237,138
INTEGRAL STRAIN TRANSDUCER
Robert R. Kooiman, Hopkins, and Robert C. Knutson, Rosemount, Minn., assignors to Rosemount Engineering Company, Minneapolis, Minn., a corporation of Minnesota
Filed Sept. 3, 1963, Ser. No. 306,378
34 Claims. (Cl. 338—4)

This application is a continuation-in-part of our application Serial No. 222,449, filed September 10, 1962, for Integral Strain Transducer.

The present invention has relation to strain transducers and more particularly to an integral transducer that utilizes no external sensing members and is small in size yet gives an accurate reading with fast response.

At the present time, pressure and temperature sensing mechanisms utilizing change in the electrical properties of some material are widely known. However, it has long been desirable to find a transducer for sensing pressure changes, in particular, that is very small in size and yet will give a satisfactory response over a wide range of pressure.

The device of the present invention is an integral strain transducer made in a manner that utilizes electrical properties of suitable semi-conductor materials, such as silicon, to achieve a very high change in resistance in relation to change in stress in the wall thereof caused by pressure.

Because of the crystal orientation of silicon and other semi-conductors, such as germanium and indium-antimonide, it has been found that by properly positioning contact terminals on a cylindrical transducer the resistance change in the material between the terminals when the transducer is stressed will be opposite in value. Therefore, the transducer can have a plurality of pairs of contacts on it to supply two or more arms of a bridge circuit and thus greatly increase the output of the bridge whenever the transducer is subjected to pressure and the electrical resistance of the transducer changes.

If desired, the transducer of the present invention can be utilized to measure temperature as well as pressure on the transducer. In the sensing circuit, a bridge is used and temperature measurements are made utilizing the total current in the bridge and stress measurements utilize the ratio of current flowing through opposite bridge arms.

The transducer, as illustrated, is cylindrical and has a solid cylindrical center bar fixedly attached at one end thereof and a glass seal supported by the center bar at the opposite end thereof to keep the transducer wall stresses due to pressure as much a pure "hoop stress" as possible and eliminate axial or orthogonal stress in order to increase the sensitivity of the unit.

A modification of the present invention presents a unique and improved method of fastening a strain transducer into the case of the pressure gauge with which it is used. A plurality of very light platinum-rhodium alloy wires or ribbons are embedded in a glass disc that is fused to the semi-conductor cylinder. The outer ends of the ribbons are then spot welded in place within the case of the pressure gauge and the transducer cylinder is held in place and is free from any external stresses which may be caused by ordinary mounting mechanism. Thus, the signal received from the transducer is due to the pressure applied to the transducer only.

A further modified form of the present invention illustrates a unique method of making electrical contacts and current conducting paths on the surfaces of semi-conductor devices which permit use of pressure transducers in a very wide temperature range. By "doping" the surface of the semi-conductor and using a portion of the doped area as a current path, the transducer finds use over a much wider range of temperatures and with very little loss of sensitivity.

The high temperature contacts can be applied to objects made of any type of material in this manner. A contact zone can be made by roughening the surface of the object in the contact locations. A suitable contact material (electrical conductor) is deposited on the surface over the roughened area and in a strip adjacent the roughened area on top of a smooth portion of the surface of the object. The deposited material will adhere to the roughened area, thereby forming contacts with integral leads that will withhold very high temperatures. Extensions to the integral leads can be attached by known procedures. Other variations of the high temperature contacts will be more fully explained later.

It is an object of the present invention to present an integral transducer that provides a high change in resistance when subjected to pressure.

It is a further object of the present invention to present a cylindrical transducer that, when subjected to pressure, will be primarily stressed in hoop stress.

It is a further object of the present invention to present a simplified transducer mounting means which eliminates stresses induced from the mounting member.

It is a still further object of the present invention to present a transducer that is operable over a wide range of temperatures.

Other and further objects are those inherent in the invention herein illustrated, described and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein.

Referring to FIGURES 1–8 and the numerals of reference thereon, a pressure gauge illustrated generally at 10 includes an outer case 11. The outer case has a first interior chamber 12 which houses a cylindrical semi-conductor transducer illustrated generally at 13. A second interior chamber 14 is also provided. A diaphragm 15 separates the second interior chamber into third and fourth chambers, 16 and 17 respectively. Third chamber 16 is open to first interior chamber 12 through a passageway 18. Thus, in effect, the first and third chambers form one large chamber. The fourth chamber 17 is open to a suitable pressure fitting 22 that in turn has a threaded connection 23 that can be attached to a pressure line or vessel in which the pressure is to be measured.

Figure 1:
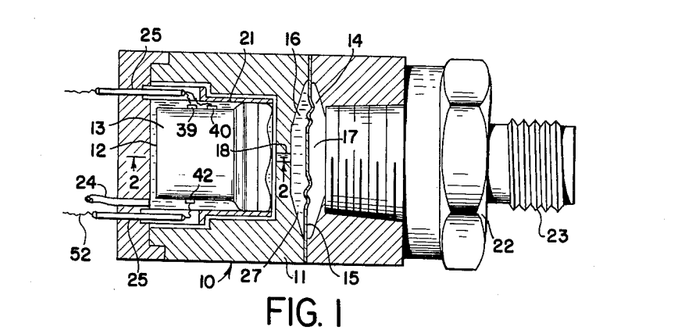
FIGURE 1 is a vertical sectional view of a pressure gauge having a strain transducer made according to a first form of the present invention as a sensing unit.

The semi-conductor transducer 13 is mounted in a cylindrical mounting member 21 that is snugly slidably mounted in first chamber 12. The cylindrical mounting member 21 has slots therein so that the transducer is subjected to pressure in chamber 12.

The first interior chamber 12 and third chamber 16 are filled with oil indicated at 27, in this form of the invention, and when the pressure gauge is subjected to pressure through fitting 22, this pressure will act on diaphragm 15 and the oil in turn will transmit the pressure to the surface of transducer 13, thus causing stress in the walls thereof. The chamber 12 is filled with oil through an oil fill tube 24 that is subsequently pinched off and sealed.

Referring specifically to FIGURES 2 through 5, the configuration of the transducer is shown. The transducer 13 is made of a cylindrical piece of suitable semi-conductor material 30. Silicon has been found to be a suitable material and will be used by way of example. The cylinder is made from a single crystal of silicon and has an annular recess 31 therein which leaves a very thin wall portion 32 and a cylinder is chemically etched away in the final stages of forming so the wall can be very thin. A thick reinforcing ring 34 is left around the outer periphery adjacent the open end 37 of the annular recess. The center bar 33 is integral with the outer wall portion 32 at the second closed end 35 of the cylinder.

Figure 2:
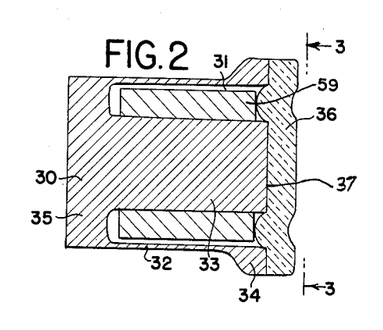
FIGURE 2 is an enlarged vertical sectional view of a semi-conductor strain transducer made according to the first form of the present invention.
Figure 3:
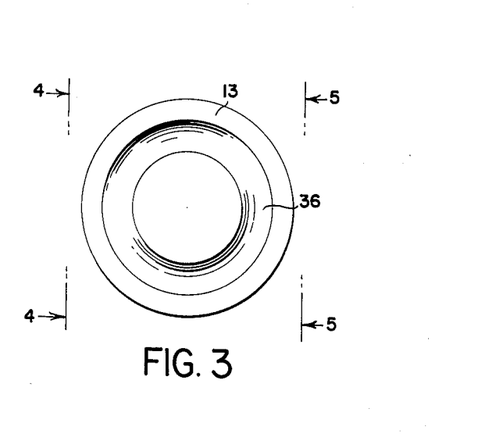
FIGURE 3 is an end elevational view of the device of FIGURE 2 as viewed on line 3—3 in FIGURE 2.

The thin wall portion 32 is used as the sensing portion of the transducer and, when subjected to pressure, will deflect, thereby causing a stress in the wall.

The open end of the cylinder is sealed with a disc-shaped piece of heat resistance glass 36 for example, Corning number 7740 Pyrex brand borosilicate glass. The glass disc is fused to the cylinder at temperatures above 1,000 degrees centigrade. After the unit cools about one-third atmosphere exists in the annular recess 31 inside the transducer. If desired, the unit could be sealed while in a vacuum furnace so that there is practically a pure vacuum inside the unit.

Figure 4:
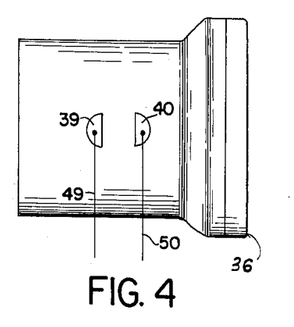
FIGURE 4 is a side elevational view of the device of FIGURE 3 taken as on line 4—4 in FIGURE 3.
Figure 5:
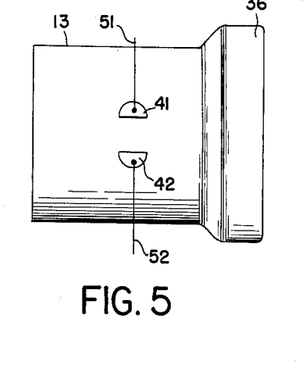
FIGURE 5 is a side elevational view of a strain transducer of the device of FIGURE 3 taken as on line 5—5 in FIGURE 3.
Figure 6:
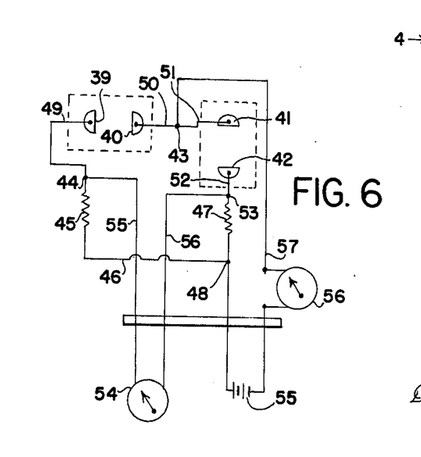
FIGURE 6 is a schematic wiring diagram of a circuit used with the strain transducer made according to the present invention for measuring temperature and pressure.

After the transducer has been sealed with the glass disc 36, localized portions of the oxide coating on the transducer surface are removed in order to place electrical contacts directly onto the silicon, as shown in FIGURES 4, 5 and schematically in FIGURE 6.

In the first form, as shown in FIGURES 4 and 5, there will be two separate pairs of contacts on each of the transducers. A first pair of contacts 39 and 40, illustrated in FIGURE 4, are positioned on the surface of transducer 13 so that the contacts are axially aligned along the cylinder wall. The contacts are attached to the cylinder wall by removing the oxide coating on the wall surface in the area of the contact. This can be done by etching or mechanically abrading. The contact areas are then covered with nickel or gold using known procedures for attaching these contacts to the silicon. A first pair of lead wires 49 and 50 are then directly soft soldered to the first pair of contacts 39 and 40 respectively.

A second pair of contacts 41 and 42 are attached to the transducer wall approximately 180 degrees from the first pair of contacts 39 and 40. The contacts 41 and 42 are positioned so that they are transverse to the axis of the cylindrical transducer. In other words, the contacts 41 and 42 are arranged so that a line joining the contacts is positioned 90 degrees to the axis of the cylinder. The second pair of contacts also are attached by etching or abrading away the oxide on the surface of the transducer and applying nickel or gold directly to the silicon in the contact area. A second pair of lead wires 51 and 52 are then soldered to the contact areas for low temperature use. The lead wires are positioned within slots provided in the mounting member 21 and pass out of the outer case 11 as at 25. The leads are hermetically sealed with respect to the case 11.

When an electric current is induced across the first pair of contacts 39 and 40 or the second pair of contacts 41 and 42, the current will flow through the semi-conductor material between the contacts. The amount of resistance in the wall itself is dependent on the distance that the contacts are apart, as well as the area of the contacts on the cylinder. When the semi-conductor material is subjected to stress the resistance to current flow between the indvidual sets or pairs of contacts will change.

In the example shown, the cylinder is made of a single crystal of "N" type silicon with the "101" direction of the silicon, determined according to the Miller indices of crystallographic orientation, parallel to the axis of the cylinder.

As illustrated in FIGURE 4, first contacts 39 and 40 are oriented along the "101" direction of the silicon, according to the Miller indices of crystallographic orientation, and any increase in pressure on the outside of the transducer will result in a decrease of resistance to electrical current flow between the first pair of contacts 39 and 40.

Referring specifically to FIGURE 5, the second pair of contacts 41 and 42 are positioned at 90 degrees to the cylinder axis. In this example this is the "100" direction of the silicon according to the Miller indices of crystallographic orientation. Any change of resistance between the second pair of contacts due to an increase of pressure on the outside of the cylinder will result in a positive change of resistance, or in other words, the resistance to electrical current flow between the two contacts 41 and 42 will increase.

Referring specifically to FIGURE 6 and the schematic wiring diagram shown therein, it will be seen that a Wheatstone bridge circuit is used for sensing the changes in resistance between the separate ones of the first and second pairs of contacts. As can be seen, leads 50 and 51, which are connected to contacts 40 and 41, respectively, are electrically connected together at a terminal 43. Lead 49, which is attached to contact 39 is electrically connected at a terminal 44 to a first side of a first resistor 45. The second side of first resistor 45 is electrically connected through a wire 46 to a second resistor 47 at terminal 48. The second resistor 47 is electrically connected at terminal 53 to lead 52 which in turn is electrically connected to contact 42. A galvanometer 54 is electrically connected through suitable leads to the terminals 53 and 44. A source of electromotive force 55 is electrically connected through suitable leads to terminals 43 and 48, respectively.

In addition, a milliammeter 56 can be electrically connected in a lead 57 which is connected to the source of electromotive force and to terminal 43. The milliammeter is used to measure the current flowing through the line 57 or the total current flowing through the bridge. The milliammeter 56 is calibrated to indicate directly the temperature on the transducer and the galvanometer 54 is calibrated to read directly in pounds per square inch of pressure on the surface of the strain transducer.

The separate current paths between contacts 39 and 40 and between 41 and 42, respectively, become the active arms of the bridge circuit illustrated in FIGURE 6. As stated previously, the resistance in the current path between contacts 39 and 40 will reduce as the pressure increases on the outside of the cylinder. The resistance to current flow between contacts 41 and 42, as stated previously, will increase as pressure increases on the outside of the cylinder. Thus, by utilizing these two resistances in adjacent arms of the bridge circuit, the output of the bridge for any given differential on pressure on the transducer is doubled over what it would be with only one active arm. As both of the active arms of the bridge are on the same transducer unit, there is no need to have two separate transducers, and it is insured that the resistance change in each arm is the result of exactly equal pressure. The galvanometer 54 measures the ratio of current flowing in the active arms.

It should be noted that the location of contacts 39 and 40 along the "101" direction of crystal orientation and the location of contacts 41 and 42 along the "100" direction of crystal orientation are the optimum locations for these contacts on a cylindrical structure of "N" type silicon which is acted upon by uniformly applied pressure, either internal or external.

The milliammeter 56 measures the total current flowing through the bridge and this is used to indicate temperature changes. The resistance in both active arms of the bridge (formed by the semi-conductor material) changes in the same direction for any temperature change. By suitable calibration, the milliammeter 56 will indicate temperature change directly.

The center bar 33 of the cylinder is included to give an optimum effect to the transducer for any given pressure. In order to have the change in stress between the pairs of contacts 39, 40 and the pairs of contacts 41, 42 at a maximum, it is desirable if the stress on the cylinder is entirely hoop stress. This results in the highest output from the transducer for any given pressure change.

As can be seen in FIGURE 2, the center bar 33 is integral at 35 with the base of the wall of the cylinder. The glass disc 36 is fused onto the center bar at the open end 37 of the cylinder. The center bar physically supports the glass disc. Thus, pressure acting on the opposite ends 35 and 37 of the cylinder will be absorbed in the center bar and the thin wall portion 32, which is used as the sensing portion of the transducer, will not be subjected to this axial stress due to pressure. The center bar mechanically supports the opposite ends of the cylinder.

As shown in FIG. 2, if desired, a sleeve 59 can be inserted in the annular recess 31 to prevent the transducer from being damaged from over pressure. For example, if the transducer was designed to operate in pressures from 0 to 100 p.s.i., the wall 32 is relatively thin, and if the pressure on the transducer was increased a great amount, it is possible that damage to the transducer could result. The clearance between the outer portion of the sleeve and the wall is very small, on the order of .001 inch. The sleeve is made of material that has the same or very nearly the same coefficient of expansion as the material from which the transducer is made. With the thermal coefficients of expansion equal, there is not any mechanical interference between the sleeve and the wall due to temperature changes. The outer surfaces of sleeve 59 will be engaged by the wall when the wall deflects more than a certain amount and thus mechanically support the wall.

Figure 7:
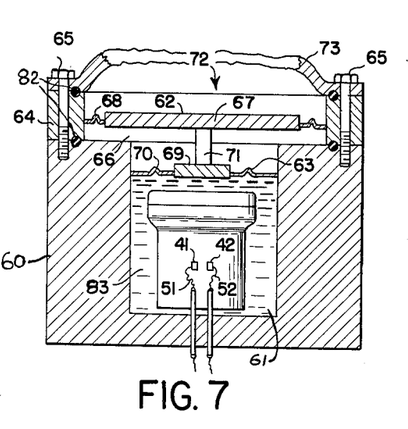
FIGURE 7 is a vertical sectional view of a modified pressure gauge which can be utilized to extend the usable range of a semi-conductor strain transducer.
Figure 8:
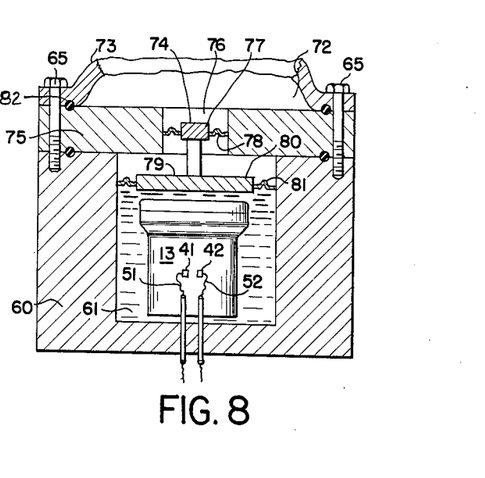
FIGURE 8 is a sectional view of the device of FIGURE 7 modified to reduce the apparent pressure on a transducer over that actually exerted on the pressure gauge.

In FIGURES 7 and 8 there is illustrated a second embodiment of the outer case of the pressure gauges. These views are enlarged but illustrate the principle involved. In FIG. 7 a pressure gauge case 60 has a first chamber 61 in which a transducer 13 is placed. A first diaphragm assembly 63 is fixedly attached to the walls of the case and seals off the first interior chamber 61. A second diaphragm assembly 62 is fixedly attached to an annular ring 64 that in turn is fixedly attached to the case 60 with suitable cap screws 65. The cap screws hold an upper housing 73 in place. A pair of resilient O rings 82 are used to seal mating surfaces between the ring 64 and the body of the case and between the ring and upper housing 73. The second diaphragm assembly 62 forms a second chamber 66 between the first diaphragm assembly 63 and the second diaphragm 62.

The second diaphragm assembly 62 is comprised of a first solid disc 67 which is of relatively large diameter and has an integral annular thin metal diaphragm member 68 integral with the outer peripheral edges of disc 67 and joining and integral with ring 64. The first diaphragm assembly 63 is comprised of a second solid disc 69 which is of relatively small diameter in relation to disc 67 and has a thin metal diaphragm member 70 integral with the outer peripheral edges thereof and extending to be integral with the interior wall of first chamber 61. A mechanical compression member 71 connects the large disc 67 with the small disc 69 and transmits force directly from the large disc to the small disc.

An upper chamber 72 formed by housing 73 of the pressure gauge is open to the pressure to be measured by the transducer. Thus, pressure in chamber 72 acts upon second diaphragm assembly 62. This forces disc 67 downwardly toward the transducer 13 positioned in chamber 61. The mechanical compression member 71 transfers the total load on the disc 67 to the disc 69. The chamber 61 is filled with oil, indicated at 83 and thus apparent pressure in pounds per square inch on the under side of disc 69 is much greater than that in chamber 72.

Assuming that the transducer 13 is designed for a range of, for example, 500 to 1,000 pounds per square inch and the pressure in chamber 72, which is to be measured, is on the order of 200 pounds per square inch. Assuming also that the effective area of the second or upper diaphragm assembly 62 has three times the effective area of the first diaphragm assembly 63, the apparent pressure on the transducer 13 in chamber 61 will be 600 p.s.i. and within the usable range of the transducer.

As can be seen in FIGURE 7, leads 51 and 52, which lead from contacts 41 and 42, respectively, pass through the outer case and are hermetically sealed with respect thereto as in the construction of pressure gauge 10.

In FIGURE 8 the case 60 again has the transducer 13 positioned within the receptacle 61. A second replacement ring 75 is used in place of ring 64. The ring 75 has a very small central opening 76 and supports a first diaphragm assembly 74. The diaphragm assembly 74 has a very small diameter disc member 77 which has in turn an integral thin metal diaphragm member 78 extending from the outer peripheral edges thereof to the interior surface of opening 76 in the ring 75.

In this form of the invention, a lower or second diaphragm assembly 79 has a disc 80 which is much larger in diameter than disc 77. Disc 80 is also connected to the interior walls of receptacle 61 with a thin metal diaphragm member 81. The chamber 61 is again filled with a non-compressable fluid, such as oil.

The upper chamber 72, which is open to the pressure to be measured, communicates directly with the diaphragm assembly 74. In this form of the invention, the strain transducer 13, as before, has a range of 500 to 1,000 pounds per square inch. However, the pressures to be measured are on the order of 10,000 pounds per square inch. If the effective diaphragm area of the upper diaphragm assembly 74 is one-tenth of the effective area of lower diaphragm assembly 79, the transducer 13 will still be usable to measure the ultra high pressures without damage as the effective pressure on the transducer will be reduced by a factor of 10. Thus, a 10,000 pounds per square inch pressure in chamber 72 will result in a 1,000 pounds per square inch actual pressure on the walls of the transducer. As before, the leads 51 and 52, which are connected to contacts 41 and 42, respectively, are passed through the case 60 and are hermetically sealed with respect thereto.

It can be seen that the change of diaphragms can be readily made in the field to accommodate a wide range of pressures with one strain transducer. By merely removing cap screws 65 and replacing one of the support rings with a ring having a diaphragm of different diameter a change in the effective range of the transducer can be made. If desired, the lower diaphragm assembly can also be replaceable to affect a greater ratio of area between the upper and lower diaphragms.

Figures 9, 10, 11, 12, 13:
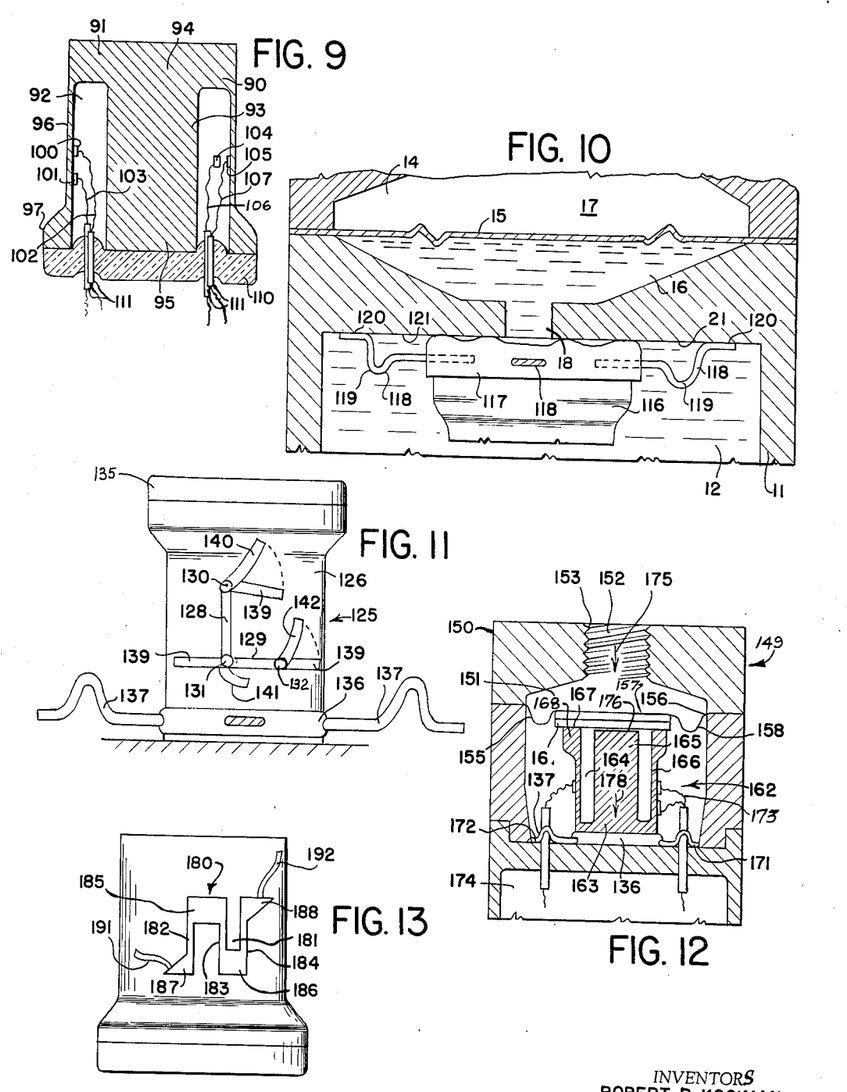
FIGURE 9 is a vertical sectional view of a modified strain transducer made according to the present invention with contacts placed on the inside of the cylinder.
FIGURE 10 is an enlarged fragmentary vertical sectional view of a pressure gauge such as that shown in FIGURE 1 and illustrating a different means for mounting the strain transducer within the pressure gauge case.
FIGURE 11 is a side elevational view of a strain transducer having contacts thereon made according to a further modified form of the present invention.
FIGURE 12 is a vertical sectional view of a pressure gauge made according to a further modified form of the present invention.
FIGURE 13 is a side elevational view of a strain transducer made according to the present invention illustrating a modified form of contacts on the surface thereof.

Referring specifically to FIGURE 9, a modified form of the present invention is shown. A transducer 90 is physically constructed substantially like transducer 13 and comprises a silicon cylinder 91 which has an annular recess 92 and a center bar 93 integral with a first end 94 of the silicon cylinder and extending toward a second or open end 95 thereof.

The cylinder 91 has a relatively thin wall portion 96 as in the previous form of the invention. A reinforcing ring 97 also extends around the second end 95 of the cylinder. A first pair of contacts or terminals 100 and 101, respectively, are positioned on the interior surface of thin wall portion 96 within the annular recess 92. The contacts 100 and 101 are axially aligned on the cylinder and, thus, are oriented along the "101" direction of the silicon. A pair of leads 102 and 103 are electrically connected to the contacts 100 and 101 as in the previous form of the invention.

A second pair of contacts or terminals 104 and 105 are positioned on the interior of wall 96 approximately 180 degrees from the first pair of contacts. The second pair of contacts are transverse to the axis of the cylinder and thus are positioned in line with the "100" direction of the silicon. A pair of leads 106 and 107 are attached to contacts 104 and 105, respectively, as in the previous form of the invention.

The leads 102, 103, 106 and 107 are positioned within an annular recess 92. A glass disc seal 110 is fused onto a second end 95 of cylinder 91 as in the previous form of the invention. However, in this form of the invention the leads 102, 103, 106 and 107 must pass through the seal in order to be connected to a suitable sensing circuit. The glass seal 110 has small holes therethrough and sleeves 111 are inserted through the holes. The sleeves 111 have openings for their respective leads. When the glass is fused onto the silicon cylinder, the sleeves and leads are also fused together to form a seal with the openings through the glass and thus seal the annular recess 92.

With the contacts placed on the inside of the cylinder, as shown, the cylinder can be used in more locations, for example where the contacts would be damaged due to the external influences to which the silicon cylinder is subjected.

It should be noted that the contacts 100, 101, 104 and 105 can be applied in the same manner as before. The interior and exterior surfaces of the silicon cylinder will be covered with an oxide coating to prevent "doping" of the silicon from the impurities in the glass during fusing of the glass seal to the cylinder. The oxide coating can be applied either before or after the contacts are placed on the cylinder. As will be seen, the glass seal is, in this form of the invention, fused onto the cylinder after the contacts have been applied.

Referring specifically to FIGURE 10, a modified form mounting a transducer in a pressure gauge case is shown. As shown, a fragmentary portion of an outer case 11 has an interior chamber 12. A diaphragm 15 divides a second interior chamber 14 into third and fourth chambers 16 and 17. A passageway 18 is open between first interior chamber 12 and chamber 16 as before. The chambers 12 and 16 are filled with oil or fluid as shown previously and in effect form one large chamber.

A transducer 116 which, as previously explained, is made of a silicon cylinder and is instrumented exactly as before, has a glass disc seal 117 fused to one end thereof. At the time the glass seal 117 is fused to the silicon cylinder, four ribbons made of platinum-rhodium alloy, approximately .008 inch thick and .040 of an inch wide, are fused into the glass. Thus, portions of the ribbons extend outwardly from the glass as shown and are integral with the glass. At the elevated temperatures used for fusing the glass seal onto the silicon cylinder the ribbons readily become bonded directly into and made an integral part of the glass.

The ribbons 118 extend outwardly radially from the glass seal and have a strain relief bend 119 defined therein. Outer end portions 120 of the ribbons are flat and extend substantially parallel to the plane of the glass seal. These outer end portions are spot welded directly to a bottom surface 121 of the interior chamber 12. Thus, the transducer 116 is held in place within the chamber and will not be permitted to shift.

This eliminates the necessity for having a mounting cylinder such as that shown at 21 in FIGURE 1. This reduces the cost of assembling the gauge as well as reducing the cost of the component parts.

In FIGURES 11, 12 and 13 there are shown transducers which can be used in extremely high temperature work. For low temperature applications, as previously described, the contacts or terminals on the transducer are plated onto the silicon and then lead wires are soft soldered to these contacts. Soft solder, of course, cannot withstand elevated temperatures and the effective temperature range of the transducers is severely limited. Another limiting factor in the use of transducers is that the resistance between the contacts will change greatly over a wide range of temperature.

For example, in certain cases, a semi-conductor material will change not only in value of resistance, but also in direction or sign. In other words, at very low temperatures, which approach absolute zero, the material will have a certain resistance. As the temperature increases toward zero degrees centigrade, for example, the resistance between contacts on the transducer will decrease. As the temperature is further raised, the resistance between the contacts will change in sign and start to increase.

It can be seen that this type of resistance change makes the transducer unusable over a wide range of temperatures.

In FIGURE 11, there is shown a transducer 125 which is made of a silicon cylinder 126 constructed substantially like that in the first form of the invention.

After forming as before with an annular recess, a reinforcing ring and a thin wall portion, the cylinder is cleaned thoroughly so that no foreign deposits are on the surface thereof. Then the cylinder, which is open and has no glass seal attached thereto or other surface embellishments thereon is "doped." In this particular form of the invention, the cylinder is "doped" by subjecting it to phosphorus pentoxide vapor at an elevated temperature. The phosphorus pentoxide and the silicon cylinder are placed within a tube, heated and the phosphorus pentoxide is atomically bonded to the silicon. The impurities in the silicon may amount to about one hundred parts per million. However, this increases the electrical conductivity of the silicon tremendously.

The cylinder is quite heavily doped so that there is a relatively thick coating of doped silicon at the surface of the cylinder.

After the doping process has been completed, the cylinder is covered with a photosensitive emulsion and is exposed to light in the area where the current path and contacts or terminals for the transducer are to be. The emulsion hardens in the exposed area. The device is then etched in a suitable solution of acid to remove the doped coating from the cylinder in all but the exposed areas. As shown in FIGURE 11, the exposed areas are the lines 128, 129, which are arranged 90 degrees to each other, and also the circular contact points 130, 131 and 132. These lines, as will be more fully explained, are more conductive than the silicon and will form a current path when the transducer is used.

After the doped coating has been etched from the surfaces of the cylinders in all but the desired current paths and contact areas, the cylinder is then subjected to oxygen at an elevated temperature to grow an oxide coating which helps to prevent any further doping on the surface in subsequent operations. Also, as will be explained, the oxide coating prevents depositing of contact material in other than the desired locations.

In this stage of operation, a glass disc seal 135 can be applied to the open end of the cylinder and sealed thereon, as previously explained.

Also, as shown for the sake of clarity in FIGURE 11, a second glass disc 136 can be bonded to the closed end of the cylinder and platinum-rhodium alloy ribbons 137 bonded into the glass disc for mounting the transducer. While ordinarily when a glass seal 135 is used on the open end of the cylinder, the ribbons will be bonded to the glass seal itself, in certain applications the glass disc 136 will be used. As will be subsequently explained, the glass disc 136 is used for mountings when there is no glass seal 135 on the open end of the cylinder.

After the glass seal 135 has been bonded to the open end of the cylinder and the unit has cooled, the oxide coating on the outside of the cylinder is mechanically abraded away or etched away in the round contact areas 130, 131 and 132. The oxide coating is left intact on the rest of the cylinder including lines 128 and 129.

The contacts are then put in place in the contact areas in this form of the invention, as disclosed, by an electroless process of nickel plating, which is well known in the art. The process generally is immersing the silicon cylinder in a suitable bath having a suitable nickel salt in solution and which is warmed to about 90 degrees centigrade. The nickel in solution in the bath will become deposited on the surface of the silicon. The nickel will not deposit on the oxide coating covering the majority of the cylinder surfaces.

After the contact areas have been built up sufficiently with nickel, the transducer is removed from the bath and the contacts are then sintered in place. This sintering process greatly strengthens the bond between the silicon and the nickel and insures that there is a good mechanical and electrical connection therebetween. The nickel contacts, it should be noted, are bonded to the "doped" coating on the cylinder surface.

While metals other than nickel can be used for the contacts, nickel has been found to give a very wide range of temperature usage without alloying with the silicon. For example, gold can be used in the contact areas, but gold alloys with the silicon at 370 degrees centigrade and destroys the properties of the transducer. Thus, the maximum temperature at which a transducer having gold contacts thereon can be used is 370 degrees centigrade. Nickel does not have any deleterious effects such as this until a temperature of over 700 degrees centigrade is reached. In addition, it is known that rhodium will work as a contact metal but again has to be used at a much lower maximum temperature than nickel.

In order to eliminate the soft soldering of lead wires onto the nickel contacts, a unique process of making high temperature connections is utilized. Once the nickel contacts have been sintered in place, small strips of the oxide coating on the cylinder's outer surface are etched away adjacent each of the contacts 130, 131 and 132. These strips are indicated at 139. Thus, the silicon its exposed in the area of the strips. The transducer is then again placed in the electroless plating bath and nickel is deposited on top of the contacts 130, 131 and 132 and also in the area defined by the strips 139. The nickel deposited in the bath at this time will adhere very well to the nickel originally deposited, both because of a relatively rough surface on the top of the nickel contact and also because of the fact that they are the same metal. However, the nickel deposited in the strips 139 will not be firmly bonded to the surface of the cylinder.

When a continuous thin ribbon of nickel has been deposited in each of the strips 139, the transducer is removed from the plating bath. A sharp instrument, such as a razor blade, is then inserted under each of the deposited ribbons of nickel and the ribbons are lifted up. These ribbons are 140, which is a lead adhering to contact 131, and ribbon 142 which is a lead adhering to contact 132.

The connection between the lead ribbons and their respective contacts will withstand as high a temperature as the contacts themselves. Thus, it can be seen that the need for soft soldering is eliminated. The lead wire junction no longer limits the temperature range of operation of the transducer.

The ribbons can be lifted from the surfaces of the cylinder after plating because the cylinder surface is very smooth after the etching operation which removes the oxide coating in the ribbon areas, and also the ribbons are not sintered after they are deposited on the surface of the cylinder. Thus, a strong bond is not made between the silicon and the deposited nicked material. However, at the contacts, the bond between the nickel ribbons and the nickel contacts is sufficiently strong to withstand normal usage, and a good electrical connection is made.

The transducer can then be connected in a standard circuit such as that illustrated in FIGURE 6. In this circuit contacts 40 and 41 would be replaced by contact 131, contact 39 would be replaced by contact 130 and contact 42 would be replaced by contact 132. The instrumentation for the circuit would be the same. The resistance of the current paths of lines can be precisely adjusted by placing an ohmmeter across the contacts of each current path and then etching the paths until the resistances are equal. When the proper resistance is obtained, the transducer is removed from the etching solution.

The doped area in the current paths 128 and 129 is much more highly conductive than the base metal. The effect of temperature on the resistance between the contacts 130, 131, and 132 is greatly reduced. The sensitivity of the unit to stress is reduced somewhat but not to a very large degree when considered in view of the very excellent improvement in temperature characteristics of the unit. The current impressed on the transducer through contacts 130, 131 and 132 will follow the paths 128 and 129. The difference in resistance between these doped paths and the base silicon is very large.

Also of great importance is that the characteristic of the difference in sign of resistance change from stress between the contacts oriented along the "100" and "101" axis of the silicon is still present. Thus, the pattern shown in FIGURE 11 gives two active arms for a bridge circuit.

If desired, a full bridge can be made by adding two current paths to the transducer parallel to lines 128 and 129 to complete a square pattern. It is also obvious that only one current path, for example, line 128 can be used with two contacts, if desired.

The depositing process for making high temperature contacts as described in connection with FIGURE 11 can be used on any material and on all semi-conductor materials in particular. For example, referring to FIGURES 14 through 16, a wafer 200 which is comprised as a disc of material, such as a semi-conductor, is to be used in an application requiring an electrical contact capable of withstanding high temperatures on the surface thereof. In applying this contact and making it utilizable under high temperature operations, a top surface 201 of the wafer is smoothed in suitable manner as by etching so that the surface is very smooth. A contact zone 202 is roughened in a suitable manner, such as lapping, in the desired contact area of the wafer. This roughened portion can be of any size, according to the dictates of the usage. Care is taken to insure that the surface 201 in the portions adjacent the contact zone 202 remain smooth.

Figure 14:
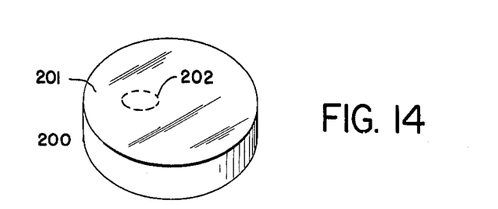
FIGURE 14 is a perspective view of a piece of semiconductor material on which an electrical current conducting contact is to be made.

The top surface 201 is then masked with a suitable material in the portions illustrated at 203. The masking can be done by any desired means, such as placing an oxide in the areas depicted by the shading 203. The contact zone 202 and a strip 204 are left unmasked The smooth surface of the disc or wafer 202 is exposed in the strip 204. In other words, the parent material of the wafer is exposed in the strip area 204.

The masking of the portions 203 can be done with a suitable pressure sensitive coating or through use of a suitable adhesive, instead of applying an oxide coating in these areas. Photoemulsion masking is widely used and can also be used in this application.

Figure 15:
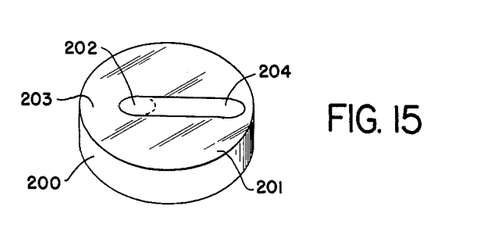
FIGURE 15 is a perspective view of the device of FIGURE 14 after a contact has been deposited on the surface thereof.

The wafer is then subjected to a suitable process for depositing an electrical conductive material, for example a metal such as nickel, in the unmasked areas of the top of the wafer as illustrated in FIGURE 15. The process can be electroless plating or vacuum evaporation, for example.

The material deposited will adhere to the roughened portions of the contact zone 202 very tightly. However, on the smooth surfaces in strip 204, the bond between the parent material of the wafer and the deposited material will be imperfect.

Figure 16:
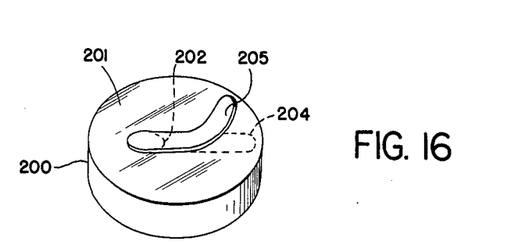
FIGURE 16 is a perspective view of the device of FIGURE 15 after an electrical current conducting tab has been raised from the surface of the device.

The material is deposited until a continuous strip of desired thickness is built up. As shown in FIGURE 16, the strip or ribbon of material 205 deposited in the unmasked strip 204 can then be lifted up from the surface of the wafer with a sharp instrument such as a razor blade. The deposited material will adhere tightly in the contact zone 202 because of the roughened surface.

Other variations of the method can be employed, for example depositing material only in the roughened area 202 first, then sintering the deposited material of the contact zone in order to enhance the bond between the parent material of wafer 202 and the first deposited material deposited in the second operation and thus a better zone and depositing an additional layer of material over the contact material and in the strip areas. The material deposited the second time will adhere to the contact, as the upper surfaces of the contact will be relatively rough. Also, the contact will be of the same material as the material depoisted in the second operation and thus a better bond will be obtained. This was also pointed out in the description of the structure of FIGURE 11.

In the utilization of high temperature strain transducers, it has been found that by having the transducer in a gaseous atmosphere, more exact readings can be obtained. Liquids such as oil cannot withstand high temperatures as they vaporize. They cannot withstand the lower temperatures to which a transducer of this type can be subjected as they become solids.

In FIGURE 12 there is shown a pressure guage 149 utilizing a transducer constructed substantially like that shown in FIGURE 11. An outer case 150 has a first interior chamber 151 which has an opening 152 that is threaded as at 153 to receive a pressure fitting (not shown). The first interior chamber 151 is thus open directly to the pressure line or vessel in which the pressure is to be measured.

A very thin stainless steel diaphragm 155 is fixedly attached to the walls of the case as at 156 and also is attached to a central stainless steel disc 157. The stainless steel diaphragm is in the order of .001 to .003 inch thick. The stainless steel diaphragm also includes a strain relief bend 158. A thin glass plate 161 is bonded to the underside of stainless steel disc 157. A transducer 162 is placed within the interior chamber 151 below diaphragm 155.

The transducer 162 includes a silicon cylinder 163, which has an annular recess 164, a cylindrical center bar 165, and a thin wall portion 166. The siilcon cylinder does not have any glass seal on the open end thereof. The glass plate 161 rests on the upper surface 167 of a reinforcing ring 168 at the open end of the cylinder.

The cylinder 163 has a glass disc 136 bonded to the closed end thereof and the disc has platinum-rhodium ribbons 137 integral therewith. The ribbons 137 are spot welded as at 171 to a bottom surface 172 of the first interior chamber 151.

The silicon cylinder 163 is thus held in position within the interior chamber 151. The cylinder can have suitable contacts placed thereon such as those in FIGURE 11, and these contacts have suitable high temperature nickel leads 173 leading therefrom, which can be wired into the standard circuit illustrated in FIGURE 6. A second interior chamber 174 can be provided in the outer case 150 for containing the electronic package of balancing resistors for the bridge circuit.

In this form of the invention pressure is introduced through opening 152 in a direction as indicated by arrow 175. The pressure acts on diaphragm 155 and disc 157. The disc 157 exerts an axial force through glass plate 161 to the silicon cylinder 163, and this force in turn causes an axial stress in the wall of the transducer thereby changing the resistance between the contacts placed on the wall. The device can be calibrated to read directly in pressure as in the previous forms of the invention.

It should be noted in FIGURE 12 that center bar 165 does not contact the glass plate 161. There is a small space below the glass plate, and this is to provide for deflection of the stainless steel disc 157 and the glass plate 161. The center bar 165 has an upper surface 176 that serves as a mechanical stop for over pressure protection of the transducer.

The very thin diaphragm 155 does not transmit force to the cylinder, and it is noted that the force on disc 157 will be exactly axial on the transducer, being exerted in direction as indicated by arrow 178. It is found that by using an arrangement such as that shown in FIGURE 12 and a transducer having electrical contacts and lead wires made as shown and described in connection with FIGURE 11, that the guage is operative over a temperature range of minus 196 degrees centigrade, which is the temperature of liquid nitrogen to plus 700 degrees centigrade. The response over this wide range of temperatures is practically a linear function and can easily be calibrated.

In FIGURE 13 there is shown a variation of a doped current conducting path illustrated at 180. The path 180 is located on a transducer 181 that is made as previously described. The path 180 has three legs 182, 183 and 184 which are axially aligned with the cylindrical transducer. The legs 182 and 183 are joined together at a junction area 185 that is relatively wide. A junction 186 between the legs 183 and 184 is also wide. Contact areas 187 and 188 are provided at opposite ends of the pattern 180 and lead ribbons 191 and 192 can be attached to the respective contacts. The leads 191 and 192 can be connected to suitable instrumentation as before.

The basic advantage of the configuration for current path shown in FIGURE 13 is that one can obtain more resistance in the doped path on a very short transducer unit by using this configuration. Because the junctions 185 and 186 which make the current travel transverse to the axis of the cylinder are quite wide, the opposite change in resistance in this area does not greatly or adversely affect the readings. The primary effect on the reading of the transducer is the change in the resistance in the legs 182, 183 and 184.

As many widely apparently different embodiments of this invention may be made without departing from the spirit and scope thereof, it is to be understood that we do not limit ourselves to the specific embodiments herein.

What is claimed is:

1. A strain transducer comprising:
    a body made of a suitable semi-conductor material and having an interior chamber and a relatively thin outer wall portion,
    electrical connection means for measuring the resistance of at least a portion of the thin wall, and
    means within said chamber to mechanically suport said thin wall when the stress therein exceeds a predetermined amount.

2. The combination as specified in claim 1 wherein said transducer is a cylinder and said means to support said wall is a tubular member within said cylinder and made of a material having substantially the same coefficient of thermal expansion as said wall.

3. The combination as specified in claim 1 wherein the transducer is a cylinder with at least one open end and wherein load is applied to the cylinder through a load member acting on an open end thereof and is axial only, and wherein said means for supporting said wall is comprised of a solid member within said interior chamber and supported from axial movement in the direction of load application with respect to the cylinder and positioned so that the load member abuts thereon when stress in the thin wall exceeds the predetermined amount.

4. A strain transducer for sensing pressures comprising:
    a body made of suitable semi-conductor material,
    a pair of spaced electrical contacts electrically and mechanically affixed to a wall thereof and aligned with a specific predetermined direction of crystal orientation of said semi-conductor material, and
    a second pair of spaced electrical contacts electrically and mechanically affixed to a wall of said body and positioned so a line joining said second pair of contacts is positioned substantially 90 degrees to a line joining said first pair of contacts, the change in resistance between said second pair of contacts being opposite in sign from the change in resistance between said first pair of contacts when said transducer is subjected to stress.

5. The combination as specified in claim 4 wherein said semi-conductor is made of a single crystal of silicon and said first terminals are aligned with the "101" direction of crystallographic orientation of said silicon, and are parallel to the longitudinal axis of said body.

6. A strain transducer for sensing pressure comprising:
    a cylindrical body made of suitable semi-conductor material, said cylindrical body being closed at one end and having an annular recess defined by a relatively thin exterior wall and an interior center bar integral with a closed end of said body and concentric with said exterior wall,
    a seal member fused to an open end of said cylinder and mechanically supported by said center bar, said seal member sealing said annular recess from the atmosphere,
    electrical connection means for measuring the resistance of at least a portion of the thin wall and in a specific direction of crystal orientation of said semi-conductor material, and
    means to mechanically support said wall to protect said transducer against over pressure.

7. The combination as specified in claim 6 wherein said means to mechanically support said wall includes a tubular member slidably mounted over said center bar and having an outer surface closely adjacent the interior surface of said thin wall portion, said tubular member having substantially the same coefficient of thermal expansion as said wall.

8. The combination as specified in claim 7 wherein said seal member is heat resistant glass and wherein said cylinder is coated with an oxide coating.

9. A strain transducer for sensing pressure comprising a body having one closed end and a recess defined therein open to the other end of said body, said body having a relatively thin exterior wall portion,
    a reinforcing ring integral with said thin wall portion adjacent an open end of said body,
    electrical contacts on said thin wall portion at spaced locations to permit passing a current through a portion of the thin wall in direction parallel to a predetermined direction of crystal orientation in said wall, and
    means to transmit pressure from a pressure source to cause stress in the wall of said transducer.

10. The combination as specified in claim 9 wherein the said recess defines a center bar extending parallel to the axis of the body, and a seal member of high temperature glass sealingly fused to the end surface of the open end of said body and mechanically supported by said center bar.

11. A pressure gauge comprising an outer case, an interior chamber within said case,
    a diaphragm dividing said interior chamber into first and second chambers, said first chamber being open to a source of pressure,
    a semi-conductor strain transducer positioned in said second chamber, said semi-conductor strain transducer having a transducer interior chamber and a thin wall portion,
    means for mounting said semi-conductor strain transducer in said second chamber,
    means to transmit pressure force from said diaphragm to said transducer, and
    electrical connection means for measuring the resistance of at least a portion of the thin wall of said strain transducer.

12. The combination as specified in claim 11 wherein said second chamber is filled with a substantially non-compressible fluid.

13. The combination as specified in claim 11 wherein said transducer has a glass disc fused thereto at one end thereof, and said means for holding said transducer mounted within said second chamber includes a plurality of metal ribbons fused to said glass disc and extending outwardly therefrom, each of said ribbons being fixedly attached to a surface of said second chamber.

14. The combination as specified in claim 13 wherein the transducer is made of silicon and is subjected to oxygen at an elevated temperature before said glass disc is fused thereto.

15. The combination as specified in claim 11 wherein said means to transfer force from the diaphragm to the transducer is substantially noncompressible.

16. The combination as specified in claim 11 wherein the electrical connections means are arranged so that the resistance of the thin wall can be measured in two separate current paths, said semi-conductor being constructed so that the stress on both paths is in the same direction.

17. The combination as specified in claim 16 wherein said current paths are at 90° to each other.

18. The combination as specified in claim 17 wherein the semi-conductor strain transducer is made of N type silicon and wherein the two paths are aligned with the 101 direction of crystallographic orientation of the silicon and the 100 direction of crystallographic orientation of said silicon, respectively.

19. The combination as specified in claim 11 wherein the transducer has a first closed end and a center bar attached to the closed end and extending toward an opposite end thereof, said center bar defining the inner bounding wall of said transducer chamber.

20. The combination as specified in claim 19 wherein the center bar extends to the opposite end of the transducer and a glass disc is sealingly fused to the transducer outer wall and the center bar.

21. A strain transducer for sensing pressure comprising a body having one closed end and a recess defined therein open to the other end of said body, said body having a relatively thin exterior wall portion, a center bar portion fixed to the closed end of the body and extending parallel to the axis of the body and defining the inner limit of the recess, said center bar portion extending to the open end of the body, a seal member sealingly attached to the end surface of the open end of said body and mechanically supported by said center bar, and electrical connection means for measuring the resistance of at least a portion of the thin wall portion of said strain transducer.

22. The combination as specified in claim 21 wherein said electrical connection means include means on the wall of the body and arranged so that the resistance of the thin wall can be measured in a path which is parallel to a specific direction of crystallographic orientation of said body.

23. In a gauge having an outer case, a semi-conductor transducer within said case, means within said case to support said transducer, and means to transfer a pressure signal from an external force to said transducer, the improvement comprising retaining means to retain said transducer in position on said support means including at least one layer of glass secured to said transducer, and at least one ribbon member secured to said glass, said ribbon being of flexible material, the outer end of said ribbon being fixed to a portion of said case.

24. The combination as specified in claim 23 wherein a plurality of ribbons are secured to the layer of glass and they are made of a metallic material, and said ribbons having an offset portion forming a strain relief bend between the location where they are secured to the glass and the location where they are fixed to the case.

25. A pressure gauge comprising an outer case having an interior chamber,
a first diaphragm dividing said interior chamber into first and second chambers,
a transducer positioned within said first chamber,
a second diaphragm removably mounted on said case and sealed with respect thereto, a first side of said second diaphragm being open to a source of pressure to be measured, the effective areas of said first and second diaphragms being substantially different,
and a mechanical compression member positioned between said first and second diaphragms, said second chamber being filled with a substantially non-compressible fluid.

26. The combination as specified in claim 25 wherein the effective diameter of the second diaphragm is substantially larger than the effective area of said first diaphragm.

27. The combination as specified in claim 25 wherein the effective diameter of said second diaphragm is substantially smaller than the effective diameter of said first diaphragm.

28. A pressure gauge comprising an outer case, said outer casing having an interior chamber,
a diaphragm member dividing said interior chamber into first and second chambers, said diaphragm member comprising a center member and an annular thin metal sheet joining said center member to the interior walls of said chamber.
a strain transducer positioned in said second chamber, said transducer having a first closed end and an interior chamber, said interior chamber being defined by a center bar within said transducer and at least partially by a relatively thin outer wall portion of said transducer, said transducer being positioned with one end thereof abutting an interior surface of said second chamber of said pressure gauge, said diaphragm being adjacent the other end of said transducer and in force transmitting relationship thereto,
means for electrically insulating said diaphragm from said transducer,
said center bar of said transducer being spaced inwardly from a plane defined by a second end surface of said transducer,
and electrical connection means for measuring the resistance of at least a portion of the thin wall of said strain transducer, said diaphragm being positioned to transmit axial loads to said transducer when said diaphragm is subjected to pressure.

29. A pressure gauge comprising an outer case, said outer casing having an interior chamber,
a diaphragm member dividing said interior chamber into first and second chambers, said diaphragm member comprising a disc-shaped member and an annular thin metal sheet joining said disc-shaped member to the interior walls of said chamber,
a strain transducer positioned in said second chamber, said transducer being substantially cylindrical in shape and having one closed end, an interior annular chamber defined in said cylindrical transducer by a cylindrical center bar and at least partially by a relatively thin wall portion of said transducer, said transducer being positioned with the closed end thereof abutting an interior surface of said second chamber and being positioned so the axis of said cylinder is substantially perpendicular to the plane of said disc-shape member of said diaphragm, said disc-shaped member being adjacent the open end of said cylinder and in force transmitting relationship thereto,
an insulating layer between said disc-shaped portion and the adjacent open end surface of said cylinder,
said center bar of said cylinder being spaced inwardly from a plane defined by the open end surface of said cylinder,
electrical connection means for measuring the resistance of at least a portion of the thin wall of said transducer, said disc-shaped portion of said diaphragm being positioned to transmit axial loads to said cylinder when said disc is subjected to pressure, and
means for mounting said cylinder within said second chamber.

30. The combination as specified in claim 29 wherein said means for mounting said transducer within said second chamber is comprised as a glass disc fused to the closed end of said cylinder on an exterior surface thereof, and a plurality of metal ribbons fused to said glass disc and extending radially outwardly therefrom and being spot welded to the surface of said case on which said cylinder abuts.

31. In a gauge having an outer case, a semi-conductor transducer within said case, means within said case to support said transducer for compression loading in one direction only and means to transfer a signal from an external source to said transducer as compression force the improvement comprising retaining means to center said transducer in position on said support means, said retaining means including at least one layer of glass fused to said transducer in location spaced from the portion of the transducer receiving load and at least one ribbon fused to said glass, said ribbon being of flexible material, the outer end of said ribbon being fixed to a portion of said case.

32. A pressure gauge comprising an outer case, said outer case having an interior chamber, a diaphragm member dividing said interior chamber into first and second chambers, a strain transducer positioned in said second chamber, said transducer having a transducer interior chamber and a relatively thin outer wall portion, said transducer being supported by an interior surface of said second chamber of said pressure gauge, and said diaphragm being in force transmitting relationship to said transducer, and electrical connections means on the transducer for measuring the resistance of at least a portion of the thin wall of the transducer, said diaphragm being constructed to transmit force to said transducer when said diaphragm is subjected to pressure.

33. A pressure gauge comprising an outer case, said outer case having an interior chamber, a diaphragm member dividing said interior chamber into first and second chambers, a strain transducer positioned in said second chamber, said transducer having a transducer interior chamber and a relatively thin outer wall portion, said transducer being positioned with one surface thereof supported by an interior surface of said second chamber of said pressure gauge, said diaphragm being adjacent an opposite surface of said transducer and in force transmitting relationship thereto, and electrical connection means to permit measuring the electrical resistance of at least a portion of the thin wall of the transducer, said diaphragm being constructed to transmit axial loads to said transducer when said diaphragm is subjected to pressure.

34. The combination as specified in claim 33 wherein said transducer has means within the transducer chamber to mechanically support said thin wall when the stress therein exceeds a predetermined amount.

References Cited by the Examiner
UNITED STATES PATENTS

| | | | |
|---|---|---|---|
| 2,632,062 | 3/1953 | Montgomery | 73—398 X |
| 2,699,069 | 1/1955 | Bailey | 73—398 X |
| 2,905,771 | 9/1959 | Burns | 73—88.5 X |
| 2,906,647 | 9/1959 | Roschen | 117—201 |
| 2,995,473 | 8/1961 | Levi | 117—201 |
| 3,035,240 | 5/1962 | Starr | 338—4 |
| 3,060,396 | 10/1962 | Gibbs et al. | 338—4 |
| 3,079,576 | 2/1963 | Kooiman | 338—4 |
| 3,149,488 | 9/1964 | Castro | 338—5 |

RICHARD M. WOOD, *Primary Examiner.*
ANTHONY BARTIS, *Examiner.*